(12) United States Patent
Sato et al.

(10) Patent No.: US 12,731,710 B2
(45) Date of Patent: Sep. 8, 2026

(54) COMPOSITE MEMBER

(71) Applicant: Panasonic Intellectual Property Management Co., Ltd., Osaka (JP)

(72) Inventors: Natsuki Sato, Osaka (JP); Naoki Kurizoe, Osaka (JP); Ryosuke Sawa, Osaka (JP); Tatsuro Yoshioka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 545 days.

(21) Appl. No.: 18/275,358

(22) PCT Filed: Feb. 5, 2021

(86) PCT No.: PCT/JP2021/004418
§ 371 (c)(1),
(2) Date: Aug. 1, 2023

(87) PCT Pub. No.: WO2022/168284
PCT Pub. Date: Aug. 11, 2022

(65) Prior Publication Data

US 2024/0132409 A1 Apr. 25, 2024
US 2024/0228383 A9 Jul. 11, 2024

(51) Int. Cl.
*H01F 1/33* (2006.01)
*C04B 28/00* (2006.01)
(Continued)

(52) U.S. Cl.
CPC ............ *H01F 1/33* (2013.01); *C04B 28/005* (2013.01); *H01F 1/06* (2013.01); *H01F 1/111* (2013.01);
(Continued)

(58) Field of Classification Search
CPC ......... C04B 28/005; C04B 2111/00422; C04B 2235/3284; C04B 2235/405; H01F 1/06; H01F 1/111; H01F 1/33; H01F 1/344
See application file for complete search history.

(56) References Cited

U.S. PATENT DOCUMENTS 5,135,576 A 8/1992 Johansen et al.
5,518,641 A 5/1996 Inuzuka et al.
(Continued)

FOREIGN PATENT DOCUMENTS

CN 108640673 B 4/2020
JP H03-159947 A 7/1991
(Continued)

OTHER PUBLICATIONS

International Search Report for corresponding Application No. PCT/JP2021/004418, mailed Apr. 27, 2021.
(Continued)

*Primary Examiner* — Gerard Higgins
(74) *Attorney, Agent, or Firm* — RENNER, OTTO, BOISSELLE & SKLAR; Luis A. Carrion

(57) ABSTRACT

Provided is a composite member including: an inorganic matrix part made from an inorganic substance that includes at least one of a metal oxide or a metal oxide hydroxide as a main component, contains substantially no single metal and alloy, and is a diamagnetic substance or a paramagnetic substance; and a ferromagnetic material part that is present inside the inorganic matrix part, directly bonds with the inorganic substance making up the inorganic matrix part, and is made from a ferromagnetic substance. In the inorganic matrix part, particles of the inorganic substance are continuously present, and the inorganic matrix part has a larger volume ratio than that of the ferromagnetic material part.

11 Claims, 6 Drawing Sheets

(51) Int. Cl.

| | |
|---|---|
| ***H01F 1/06*** | (2006.01) |
| ***H01F 1/11*** | (2006.01) |
| *C04B 111/00* | (2006.01) |

(52) U.S. Cl.

CPC ............... *C04B 2111/00422* (2013.01); *C04B 2235/3284* (2013.01); *C04B 2235/405* (2013.01)

(56) References Cited

U.S. PATENT DOCUMENTS

| | | | |
|---|---|---|---|
| 5,683,617 | A | 11/1997 | Inuzuka et al. |
| 7,094,718 | B2 | 8/2006 | Kwon et al. |
| 8,840,800 | B2 | 9/2014 | Suetsuna et al. |
| 2003/0155548 | A1 | 8/2003 | Ozawa et al. |
| 2006/0068196 | A1 | 3/2006 | Suenaga et al. |

FOREIGN PATENT DOCUMENTS

| | | | |
|---|---|---|---|
| JP | 6-215919 | A | 8/1994 |
| JP | H10-321427 | A | 12/1998 |
| JP | 2006-121063 | A | 5/2006 |
| JP | 2007-251061 | A | 9/2007 |
| JP | 2018-22867 | A | 2/2018 |
| WO | 01/84563 | A1 | 11/2001 |
| WO | 2018/081109 | A1 | 5/2018 |

OTHER PUBLICATIONS

Written Opinion for corresponding Application No. PCT/JP2021/004418, mailed Apr. 27, 2022.

Extended European Search Report for corresponding EP Application No. 21924678.2 issued Mar. 21, 2024.

(a)

(b)

(a)

(b)

(a)

(b)

COMPOSITE MEMBER

TECHNICAL FIELD

The present invention relates to a composite member.

BACKGROUND ART

Magnets are used in various motors and electromagnetic relays used in home appliances, information equipment, and automobiles. Examples of such magnets include ferrite magnets using barium ferrite and strontium ferrite, and rare earth magnets using rare earth metals such as samarium and neodymium. In addition, bonded magnets in which magnet powder is bonded using rubber or plastic are also widely used.

Here, magnets made from active metallic materials, such as rare earth magnets, are easily oxidized by oxygen or the like, and the magnetic properties deteriorate. Thus, techniques of coating magnets to reduce their contact with oxygen and prevent deterioration of the magnetic properties have been studied. For example, Patent Literature 1 discloses a hydraulic composition bonded magnet where a magnetic powder is retained in a hydraulic composition obtained by hardening a hydraulic powder. As the hydraulic composition, a hydraulic powder that hardens with water such as Portland cement, a non-hydraulic powder that does not harden in contact with water, and a workability modifier such as a thermoplastic resin are used. Such a hydraulic composition bonded magnet is described as exhibiting excellent corrosion resistance, excellent heat resistance, and high strength.

CITATION LIST

Patent Literature

Patent Literature 1: International Publication WO 01/84563

SUMMARY OF INVENTION

However, the hydraulic composition used in Patent Literature 1, which is obtained by hardening a hydraulic powder, has many pores because it is formed through a hydration reaction. Therefore, the magnetic powder is easily oxidized in contact with oxygen, and the deterioration of the magnetic properties may not be sufficiently prevented.

The present invention has been made in consideration of the above issue, which is inherent in the related art. An object of the present invention is to provide a composite member capable of suppressing the deterioration of a ferromagnetic substance and maintaining magnetic properties over a long period of time.

In response to the above issue, a composite member according to an aspect of the present invention includes an inorganic matrix part made from an inorganic substance that includes at least one of a metal oxide or a metal oxide hydroxide as a main component, contains substantially no single metal and alloy, and is a diamagnetic substance or a paramagnetic substance, and a ferromagnetic material part that is present inside the inorganic matrix part, directly bonds with the inorganic substance making up the inorganic matrix part, and is made from a ferromagnetic substance. In the inorganic matrix part, particles of the inorganic substance are continuously present, and the inorganic matrix part has a larger volume ratio than that of the ferromagnetic material part.

BRIEF DESCRIPTION OF DRAWINGS

FIG. 2(*b*) is a cross-sectional view schematically illustrating the vicinity of grain boundaries of a particle group of an inorganic substance.

FIG. 6(*b*) is a diagram illustrating binarized data of the secondary electron image at position 1 in the test sample of the example.

FIG. 7(*b*) is a diagram illustrating binarized data of the secondary electron image at position 2 in the test sample of the example.

FIG. 8(*b*) is a diagram illustrating binarized data of the secondary electron image at position 3 in the test sample of the example.

DESCRIPTION OF EMBODIMENTS

Figure 1:
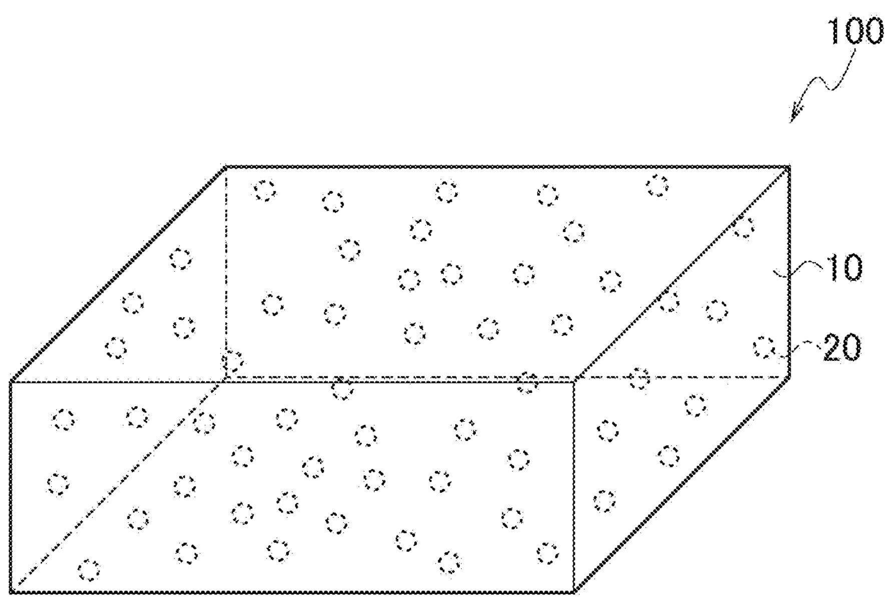
FIG. 1 is a perspective view schematically illustrating an example of a composite member according to a present embodiment.

Referring to the drawings, a description is given below of a composite member according to the present embodiment. Note that dimensional ratios in the drawings are exaggerated for convenience of the description and are sometimes different from actual ratios.

[Composite Member]

A composite member according to the present embodiment includes an inorganic matrix part 10 and a ferromagnetic material part 20 that directly bonds with the inorganic matrix part 10 with no adhesive material which is different from an inorganic substance making up the inorganic matrix part 10 provided therebetween. Specifically, the composite member 100 in FIG. 1 includes the inorganic matrix part 10 made from the inorganic substance, and the ferromagnetic material part 20, which is present in a dispersed state within the inorganic matrix part 10.

Figure 2:
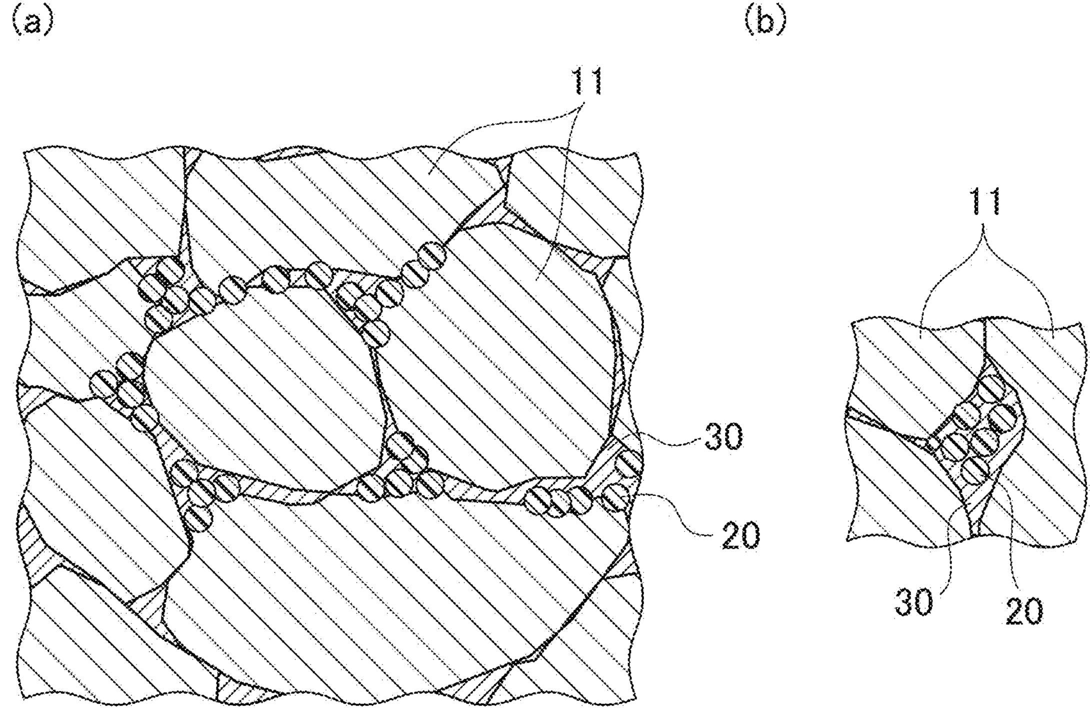
FIG. 2(*a*) is a schematic view illustrating an enlarged cross section of the composite member according to the present embodiment.

As illustrated in FIG. 2, the inorganic matrix part 10 includes multiple particles 11 made from an inorganic substance, and the particles 11 made from the inorganic substance bond with each other to form the inorganic matrix part 10.

The inorganic substance making up the inorganic matrix part 10 preferably contains at least one metallic element selected from the group consisting of an alkali metal, an alkaline earth metal, a transition metal, a base metal, and a semimetal. In this description, the alkaline earth metal includes beryllium and magnesium in addition to calcium, strontium, barium, and radium. The base metal includes aluminum, zinc, gallium, cadmium, indium, tin, mercury, thallium, lead, bismuth, and polonium. The semimetal includes boron, silicon, germanium, arsenic, antimony, and tellurium. Among these, the inorganic substance preferably contains at least one metallic element selected from the group consisting of zinc, aluminum, and magnesium. As is described below, it becomes possible for the inorganic substance containing a metallic element mentioned above to easily form a connection part derived from the inorganic substance using a pressure heating method.

The inorganic substance preferably contains at least one of an oxide or an oxide hydroxide of a metallic element mentioned above. The inorganic substance more preferably contains at least one of an oxide or an oxide hydroxide of a metallic element mentioned above as a main component. That is, the inorganic substance preferably contains at least one of an oxide or an oxide hydroxide of a metallic element mentioned above in an amount of 50 mol % or more, more preferably in an amount of 80 mol % or more. Note that the above-described oxide of a metallic element includes a phosphate, a silicate, an aluminate, and a borate in addition to a compound in which only oxygen bonds with the metallic element. Such an inorganic substance has high stability against oxygen and water vapor in the atmosphere. Accordingly, arranging the ferromagnetic material part 20 inside the inorganic matrix part 10 reduces contact of the ferromagnetic material part 20 with oxygen and water vapor and thus can suppress deterioration of the ferromagnetic material part 20.

The inorganic substance making up the inorganic matrix part 10 is particularly preferably an oxide. When the inorganic substance is made from an oxide of a metallic element mentioned above, the composite member 100 can be obtained having high durability. Note that the oxide of a metallic element is preferably a compound in which only oxygen bonds with the metallic element.

The inorganic matrix part 10 is preferably a polycrystalline substance. That is, it is preferable that the particles 11 of the inorganic substance be crystalline particles and the inorganic matrix part 10 be made from an aggregation of many particles 11. When the inorganic substance making up the inorganic matrix part 10 is a polycrystalline substance, the composite member 100 can be obtained having high durability compared to the case where the inorganic substance is made from an amorphous substance. Note that the particles 11 of the inorganic substance are more preferably crystalline particles containing at least one metallic element selected from the group consisting of an alkali metal, an alkaline earth metal, a transition metal, a base metal, and a semimetal. The particles 11 of the inorganic substance are preferably crystalline particles containing at least one of an oxide or an oxide hydroxide of a metallic element mentioned above. The particles 11 of the inorganic substance are more preferably crystalline particles containing at least one of an oxide or an oxide hydroxide of a metallic element mentioned above as a main component.

Note that it is also preferable that the inorganic substance making up the inorganic matrix part 10 be boehmite. Boehmite is aluminum oxide hydroxide represented by a composition formula of AlOOH. Boehmite is insoluble in water and hardly reacts with acids and alkalis at room temperature, and thus has high chemical stability. Boehmite also has excellent heat resistance due to a high dehydration temperature of around 500° C. Since boehmite has a relative density of about 3.07, when the inorganic matrix part 10 is made from boehmite, the composite member 100 can be obtained being lightweight and having excellent chemical stability.

When the inorganic substance making up the inorganic matrix part 10 is boehmite, the particles 11 may be particles only of a boehmite phase, or particles of a mixed phase of boehmite and aluminum oxide or aluminum hydroxide other than boehmite. For example, the particles 11 may be a mixture of a phase of boehmite and a phase of gibbsite ($Al(OH)_3$).

The average particle size of the particles 11 of the inorganic substance making up the inorganic matrix part 10 is not particularly limited. The average particle size of the particles 11 is preferably 300 nm or more and 50 μm or less, more preferably 300 nm or more and 30 μm or less, still more preferably 300 nm or more and 10 μm or less, particularly preferably 300 nm or more and 5 μm or less. The average particle size of the particles 11 of the inorganic substance within these ranges causes the particles 11 to firmly bond with each other, increasing the strength of the inorganic matrix part 10. The average particle size of the particles 11 of the inorganic substance within these ranges causes the percentage of pores present inside the inorganic matrix part 10 to be 20% or less, and it becomes possible to suppress the deterioration of the ferromagnetic material part 20, as described below. Note that in this description, the value of "average particle size" is, unless otherwise stated, a value calculated as an average value of the particle size of particles observed in several to several tens of visual fields by using observation means such as a scanning electron microscope (SEM) or a transmission electron microscope (TEM).

The shape of the particles 11 of the inorganic substance is not particularly limited and may be spherical, for example. The particles 11 may be whisker-like (acicular) particles or scaly particles. Whisker-like particles or scaly particles have higher contact with other particles compared to spherical particles, which easily improves the strength of the inorganic matrix part 10. Thus, by using particles of such a shape for the particles 11, it becomes possible to enhance the strength of the entire composite member 100. Note that as the particles 11, which are whisker-like, particles containing at least one of zinc oxide (ZnO) or aluminum oxide ($Al_2O_3$) can be used, for example.

The inorganic substance making up the inorganic matrix part 10 is preferably a diamagnetic substance or a paramagnetic substance. That is, the inorganic substance is preferably a paramagnetic substance, which is weakly attracted in the direction of a magnetic field, or a diamagnetic substance, which exhibits weak repulsion in the direction of a magnetic field. The inorganic substance when made from a diamagnetic substance or a paramagnetic substance exhibits only slight magnetism. Hence, the inorganic matrix part 10 made from the inorganic substance also exhibits only slight magnetism, and thus the composite member 100 can exhibit magnetic properties due to the ferromagnetic material part 20.

As described above, the inorganic substance making up the inorganic matrix part 10 more preferably contains at least one of a metal oxide or a metal oxide hydroxide as a main component. Thus, the inorganic matrix part 10 also preferably contains at least one of a metal oxide or a metal oxide hydroxide as a main component. That is, the inorganic matrix part 10 preferably contains at least one of a metal oxide or a metal oxide hydroxide in an amount of 50 mol % or more, more preferably in an amount of 80 mol % or more.

Here, the inorganic substance making up the inorganic matrix part 10 preferably contains substantially no single metal and alloy. Single metals and alloys are often less stable against oxygen and water vapor in the atmosphere than metal oxides and metal oxide hydroxides. Thus, from the viewpoint of enhancing the stability of the inorganic matrix part 10 itself and further suppressing the oxidative deterioration of the ferromagnetic material part 20, the inorganic substance preferably contains substantially no single metal and alloy. Note that in this description, "an inorganic substance contains substantially no single metal and alloy" means that the inorganic substance does not intentionally contain any single metal and alloy. Thus, when a metal and/or an alloy is mixed into an inorganic substance as an inevitable impurity, the condition: "an inorganic substance contains substantially no single metal and alloy" is satisfied.

Also, the inorganic substance making up the inorganic matrix part 10 preferably contains substantially no hydrate. In this description, "an inorganic substance contains substantially no hydrate" means that the inorganic substance does not intentionally contain any hydrate. Thus, when a hydrate is mixed into an inorganic substance as an inevitable impurity, the condition: "an inorganic substance contains substantially no hydrate" is satisfied. Note that since boehmite is a metal oxide hydroxide, boehmite is not included in hydrates in this description.

Note that the inorganic substance making up the inorganic matrix part 10 preferably contains no hydrate of a calcium compound. The calcium compound here is tricalcium silicate (alite, $3CaO \cdot SiO_2$), dicalcium silicate (belite, $2CaO \cdot SiO_2$), calcium aluminate ($3CaO \cdot Al_2O_3$), calcium aluminoferrite ($4CaO \cdot Al_2O_3 \cdot Fe_2O_3$), or calcium sulfate ($CaSO_4 \cdot 2H_2O$). When the inorganic substance making up the inorganic matrix part 10 contains a hydrate of a calcium compound mentioned above, the composite member obtained may have a porosity exceeding 20% in the cross section of the inorganic matrix part. Thus, the inorganic substance preferably contains no hydrate of a calcium compound mentioned above. The inorganic substance making up the inorganic matrix part 10 also preferably contains no phosphate cement, zinc phosphate cement, and calcium phosphate cement. With the inorganic substance not containing these cements, it becomes possible to cause the obtained composite member to have a porosity of 20% or less.

The composite member 100 includes the ferromagnetic material part 20 arranged inside the inorganic matrix part 10. The ferromagnetic material part 20 is made from a ferromagnetic substance that is strongly attracted in the direction of a magnetic field. As described above, the inorganic substance making up the inorganic matrix part 10 is a diamagnetic substance or a paramagnetic substance, and thus the inorganic matrix part 10 exhibits only slight magnetism. Thus, by arranging the ferromagnetic material part 20, which is a ferromagnetic substance, inside the inorganic matrix part 10, the composite member 100 can exhibit magnetic properties due to the ferromagnetic material part 20.

The ferromagnetic substance making up the ferromagnetic material part 20 is not particularly limited. Examples of the ferromagnetic substance include ferromagnets such as iron, nickel, cobalt, gadolinium, alnico (Al—Ni—Co), samarium-cobalt (Sm—Co) alloy, and neodymium-iron-boron (Nd—Fe—B) alloy, and ferrimagnets such as ferrite, $Fe_3O_4$, $MnO \cdot Fe_2O_3$, and $BaO \cdot 6Fe_2O_3$.

The ferromagnetic material part 20 preferably contains at least one of a hard magnetic substance or a soft magnetic substance. The hard magnetic substance is not particularly limited as long as it has a large coercive force and does not demagnetize easily against an external magnetic field. Examples of the hard magnetic substance include alnico, ferrite, samarium-cobalt, neodymium-iron-boron, and samarium-iron-nitrogen. The soft magnetic substance is not particularly limited as long as it is a magnetic material that changes magnetization in response to the direction and magnitude of an external magnetic field. Examples of the soft magnetic substance include iron, silicon-iron, permalloy, iron-silicon-aluminum, permenjoule, and electromagnetic stainless steel.

The ferromagnetic material part 20 also preferably contains a metal exhibiting ferromagnetism. Examples of such a metal include iron, nickel, and cobalt.

Here, the shape of the ferromagnetic material part 20 arranged inside the inorganic matrix part 10 is not particularly limited. For example, the ferromagnetic material part 20 may be in the form of particles as in the composite member 100 illustrated in FIGS. 1 and 2. When the ferromagnetic material part 20 is in the form of particles, it becomes possible to disperse the ferromagnetic material part 20 throughout the interior of the inorganic matrix part 10. The ferromagnetic material part 20 may also be in a massive form as in the composite member 100A illustrated in FIG. 3. With the ferromagnetic material part 20 in a massive form, it becomes possible to arrange the ferromagnetic material part 20 at a predetermined position inside the inorganic matrix part 10, for example.

As described above, in the composite member 100, the inorganic matrix part 10 preferably includes a group of particles of an inorganic substance. That is, it is preferable that the inorganic matrix part 10 include multiple particles 11 made from an inorganic substance and that the particles 11 of the inorganic substance bond with each other to form the inorganic matrix part 10. Here, the particles 11 may be in point contact with each other, or in surface contact with each other via particle surfaces of the particles 11. The ferromagnetic material part 20 is preferably present in an approximately uniformly dispersed state inside the inorganic matrix parts 10. However, the ferromagnetic material part 20 is preferably present at grain boundaries of the particles 11 of the inorganic substance. As illustrated in FIG. 2, by unevenly distributing the ferromagnetic material part 20 among adjacent particles 11 of the inorganic substance, the ferromagnetic material part 20 is distributed to fill gaps among the particles 11 of the inorganic substance. Thus, it becomes possible to further reduce the ratio of pores present inside the inorganic matrix part 10.

Here, in the composite member 100, when the inorganic matrix part 10 is made from a group of particles of an inorganic substance, the ferromagnetic material part 20 may be present among adjacent particles 11 of the inorganic substances. However, as illustrated in FIG. 2, in addition to the ferromagnetic material part 20, an amorphous part 30 containing an amorphous inorganic compound may be present among the adjacent particles 11 of the inorganic substance. The presence of the amorphous part 30 causes the adjacent particles 11 of the inorganic substance to bond with each other via the amorphous part 30, and thus it becomes possible to further enhance the strength of the inorganic matrix part 10. Note that the amorphous part 30 is preferably present in such a way as to come into contact with at least surfaces of the particles 11 of the inorganic substance. The amorphous part 30 may be present between the particles 11 of the inorganic substance and the ferromagnetic material part 20, and among adjacent particles of the ferromagnetic material part 20, in addition to among the adjacent particles 11 of the inorganic substance.

The amorphous part 30 preferably contains an amorphous inorganic compound. Specifically, the amorphous part 30 may be a part of only an amorphous inorganic compound or a part of a mixture of an amorphous inorganic compound and a crystalline inorganic compound. The amorphous part 30 may be a part in which the crystalline inorganic compound is dispersed inside the amorphous inorganic compound.

It is preferable that the particles 11 of the inorganic substance and the amorphous part 30 contain the same metallic element and that the metallic element be at least one selected from the group consisting of an alkali metal, an alkaline earth metal, a transition metal, a base metal, and a semimetal. That is, the inorganic compound making up the particles 11 and the amorphous inorganic compound making up the amorphous part 30 preferably contain at least the same metallic element. The inorganic compound making up the particles 11 and the amorphous inorganic compound making up the amorphous part 30 may have the same chemical composition or may have different chemical compositions. Specifically, when the metallic element is zinc, the inorganic compound making up the particles 11 and the amorphous inorganic compound making up the amorphous part 30 may both be zinc oxide (ZnO). Alternatively, while the inorganic compound making up the particles 11 is ZnO, the amorphous inorganic compound making up the amorphous part 30 may be a zinc-containing oxide other than ZnO.

Note that when the amorphous part 30 is a part of a mixture of an amorphous inorganic compound and a crystalline inorganic compound, the amorphous inorganic compound and the crystalline inorganic compound may have the same chemical composition or may have different chemical compositions.

In the composite member 100, the particles 11 and the amorphous part 30 preferably contain an oxide of at least one metallic element selected from the group consisting of an alkali metal, an alkaline earth metal, a transition metal, a base metal, and a semimetal. Since the oxide of such a metallic element has high durability, contact of the ferromagnetic material part 20 with oxygen and water vapor is reduced for a long time, and thus deterioration of the ferromagnetic material part 20 can be suppressed.

An oxide of a metallic element contained in both the particles 11 and the amorphous part 30 is preferably at least one selected from the group consisting of zinc oxide, magnesium oxide, and a composite of zinc oxide and magnesium oxide. As is described below, by using an oxide of a metallic element mentioned above, it becomes possible to form the amorphous part 30 with a simple method.

As described above, the inorganic substance making up the inorganic matrix part 10 may be boehmite. In this case, the particles 11 of the inorganic matrix part 10 may be particles only of a boehmite phase, or particles of a mixed phase of boehmite and aluminum oxide or aluminum hydroxide other than boehmite. In this case, the adjacent particles 11 are preferably bonded through at least one of an oxide or an oxide hydroxide of aluminum. That is, the particles 11 are preferably not bonded through an organic binder made from an organic compound and are not also bonded through an inorganic binder made from an inorganic compound except for an oxide and an oxide hydroxide of aluminum. Note that when the adjacent particles 11 are bonded through at least one of an oxide or an oxide hydroxide of aluminum, the oxide and the oxide hydroxide of aluminum may be crystalline or may be amorphous.

Note that in the inorganic matrix part 10 made from boehmite, the presence ratio of the boehmite phase is preferably 50% by mass or more, more preferably 60% by mass or more, still more preferably 70% by mass or more. By increasing the ratio of the boehmite phase, the inorganic matrix part 10 can be obtained being lightweight and having excellent chemical stability and heat resistance. Note that the ratio of the boehmite phase in the inorganic matrix part 10 can be obtained by measuring the X-ray diffraction pattern of the inorganic matrix part 10 using an X-ray diffraction method and then performing a Rietveld analysis.

In the composite member 100 according to the present embodiment, as described above, the ferromagnetic material part 20 made from a ferromagnetic substance is arranged inside the inorganic matrix part 10. The inorganic matrix part 10 is made from an inorganic substance including at least one of a metal oxide or a metal oxide hydroxide as the main component. Metal oxides and metal oxide hydroxides are highly stable against oxygen and water vapor in the atmosphere. Thus, when the inorganic substance of the inorganic matrix part 10 is made from a metal oxide or a metal oxide hydroxide, the oxygen permeability of the inorganic matrix part 10 becomes low and the gas barrier property is improved. Consequently, contact of the ferromagnetic material part 20 with oxygen and water vapor is reduced, and thus deterioration of the ferromagnetic material part 20 can be suppressed. Since the inorganic substance is a diamagnetic substance or a paramagnetic substance, the inorganic matrix part 10 exhibits only slight magnetism. Thus, the composite member 100 can exhibit magnetic properties due to the ferromagnetic material part 20.

Here, the particles 11 of the inorganic substance are preferably continuously present in the inorganic matrix part 10 of the composite member 100. That is, as illustrated in FIG. 2, in the inorganic matrix part 10, the particles 11 of the inorganic substance are preferably connected in contact with each other or are connected to each other through the amorphous part 30. The entire surface of the ferromagnetic material part 20 is preferably covered with the inorganic matrix part 10. Consequently, the contact of the ferromagnetic material part 20 with oxygen and water vapor is further reduced, and thus it becomes possible to further suppress the oxidative deterioration of the ferromagnetic material part 20.

In the composite member 100, the inorganic matrix part 10 preferably has a larger volume ratio than that of the ferromagnetic material part 20. In the composite member 100, increasing the volume of the inorganic matrix part 10 to be greater than the volume of the ferromagnetic material part 20 causes the periphery of the ferromagnetic material part 20 to be easily covered with the particles 11 of the inorganic substance. Thus, from the viewpoint of further suppressing the deterioration of the ferromagnetic material part 20, the inorganic matrix part 10 preferably has a larger volume ratio than that of the ferromagnetic material part 20.

In the composite member 100, the porosity in the cross section of the inorganic matrix part 10 is preferably 20% or less. That is, when the cross section of the inorganic matrix part 10 is observed, the average value of the percentage of pores per unit area is preferably 20% or less. When the porosity is 20% or less, the ferromagnetic material part 20 can be sealed inside the dense inorganic substance. Thus, the ratio of contact between the ferromagnetic material part 20 and oxygen and water vapor from the outside of the composite member 100 decreases, and it becomes possible to suppress the oxidation of the ferromagnetic material part 20 and maintain the magnetism of the ferromagnetic material part 20 for a long time. Furthermore, in this case, the composite member 100 can have high strength because the inorganic matrix part 10 has few internal pores and the inorganic substance is dense. Note that the porosity in the cross section of the inorganic matrix part 10 is preferably 15% or less, more preferably 10% or less, even more preferably 5% or less. As the porosity in the cross section of the inorganic matrix part 10 is smaller, the contact of the ferromagnetic material part 20 with oxygen and water vapor is reduced, and thus it becomes possible to prevent the deterioration of the ferromagnetic material part 20.

In this description, the porosity can be determined as follows. First, the cross section of the inorganic matrix part 10 is observed to distinguish the inorganic matrix part 10, the ferromagnetic material part 20, and the pores. Then, the unit area and the area of pores in that unit area are measured to obtain the ratio of pores per unit area. After the ratio of pores per unit area is obtained at multiple points, the average value of the ratio of pores per unit area is taken as the porosity. Note that when the cross section of the inorganic matrix part 10 is observed, an optical microscope, a scanning electron microscope (SEM), or a transmission electron microscope (TEM) can be used. The unit area and the area of pores in that unit area may be measured by binarizing an image observed with a microscope.

Note that the shape of the composite member 100 is not particularly limited and can be a plate shape, for example. A thickness t of the composite member 100 is not particularly limited and can be 50 μm or more, for example. As described below, the composite member 100 is formed using a pressure heating method, and thus the composite member 100 can be easily obtained having a large thickness. Note that the thickness t of the composite member 100 can be 1 mm or more, or can be 1 cm or more. The upper limit of the thickness t of the composite member 100 is not particularly limited, and it can be 50 cm, for example.

Figure 4:
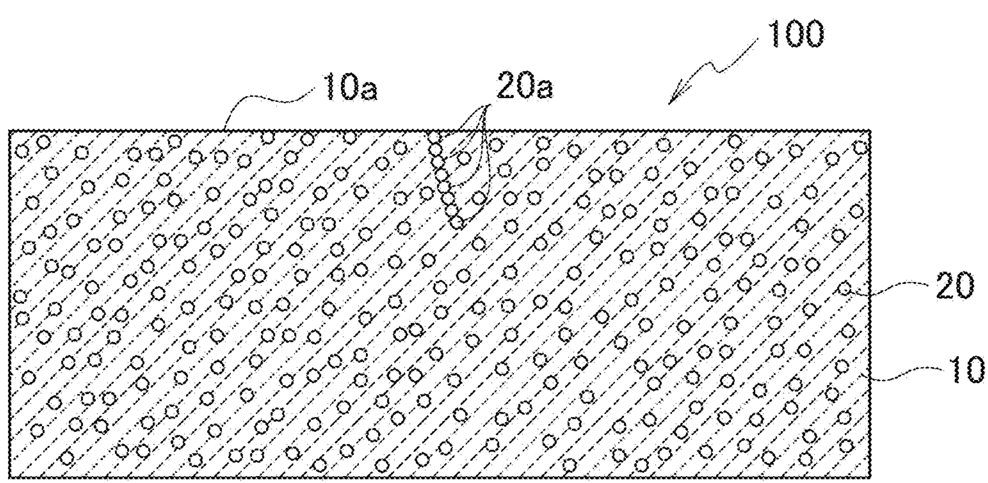
FIG. 4 is a cross-sectional view schematically illustrating yet another example of the composite member according to the present embodiment.

In the composite member 100, it is preferable that the ferromagnetic material part 20 not be present continuously from a surface 10*a* of the inorganic matrix part 10 to the inside, and not be present in the form of a film on the surface 10*a* of the inorganic matrix part 10. Specifically, as illustrated in FIG. 4, a ferromagnetic material part 20*a* present on the surface 10*a* of the inorganic matrix part 10 may deteriorate by being in contact with oxygen and water vapor in the atmosphere. Furthermore, the ferromagnetic material part 20*a* present continuously from the surface 10*a* to the inside of the inorganic matrix part 10 may also deteriorate due to the oxidative deterioration of the ferromagnetic material part 20*a* present on the surface 10*a*. Thus, from the viewpoint of suppressing the deterioration of the ferromagnetic material part 20, it is preferable that the ferromagnetic material part 20 not be present continuously from the surface 10*a* to the inside, and not be present in a film form on the surface 10*a*.

Figure 5:
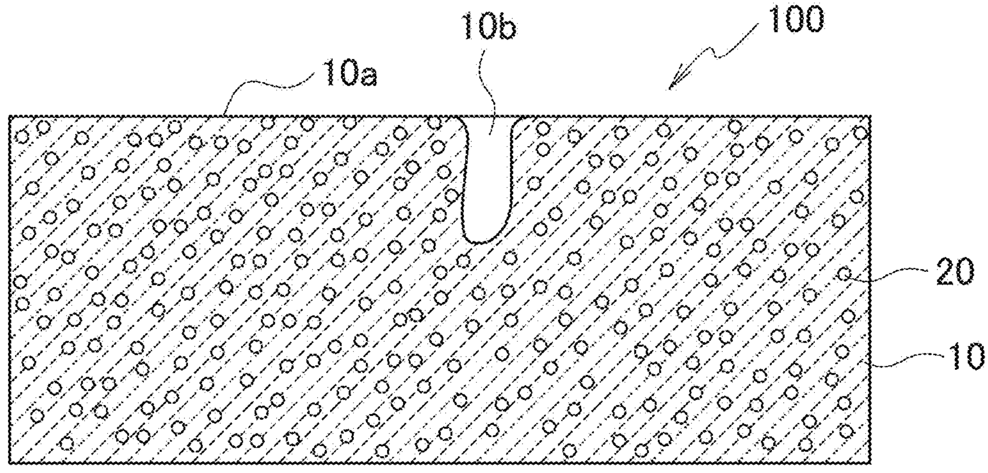
FIG. 5 is a cross-sectional view schematically illustrating yet another example of the composite member according to the present embodiment.

In the composite member 100, the inorganic matrix part 10 preferably has no gap 10*b* communicating from the surface 10*a* to the inside of the inorganic matrix part 10. The ferromagnetic material part 20 inside the inorganic matrix part 10 is covered with the particles 11 of the inorganic substance and thus is resistant to oxidative deterioration. However, as illustrated in FIG. 5, when the gap 10*b* is present in the inorganic matrix part 10, oxygen and water vapor may reach the inside of the inorganic matrix part 10 through the gap 10*b* and may come into contact with the ferromagnetic material part 20 inside the inorganic matrix part 10. Thus, from the viewpoint of suppressing the oxidative deterioration of the ferromagnetic material part 20, the inorganic matrix part 10 preferably has no gap 10*b* communicating from the surface 10*a* to the inside.

As described above, the composite member 100, 100A according to the present embodiment includes the inorganic matrix part 10, which is made from an inorganic substance that includes at least one of a metal oxide or a metal oxide hydroxide as the main component, contains substantially no single metal and alloy, and is a diamagnetic substance or a paramagnetic substance. The composite member 100, 100A further includes the ferromagnetic material part 20, which is present inside the inorganic matrix part 10, directly bonds with the inorganic substance making up the inorganic matrix part 10, and is made from a ferromagnetic substance. In the inorganic matrix part 10, the particles 11 of the inorganic substance are continuously present, and the inorganic matrix part 10 has a larger volume ratio than that of the ferromagnetic material part 20. In the composite member 100, 100A according to the present embodiment, the ferromagnetic material part 20 is arranged inside the inorganic matrix part 10. Hence, the inorganic matrix part 10 reduces the contact of the ferromagnetic material part 20 with oxygen and water vapor, and thus can suppress the deterioration of the ferromagnetic material part 20 and maintain the magnetic properties for a long time.

Furthermore, for example, in a conventional magnetic material made from ceramic, the constituent material is limited to specific ceramic. That is, in a ferrite magnet, for example, the constituent material is limited to specific ferrite. Since the constituent material is limited, it is difficult to adjust as appropriate the thermal conductivity and properties such as hardness and strength of the magnetic substance. However, in the composite member 100, 100A, the inorganic matrix part 10 described above is used as the matrix of the ferromagnetic material part 20. Thus, by adjusting the constituent materials of the inorganic matrix part 10, the thermal conductivity and properties such as hardness and strength of the composite member 100, 100A are adjustable as appropriate.

[Method for Manufacturing Composite Member]

Next, a method for manufacturing a composite member according to the present embodiment will be described. The composite member can be manufactured by pressurizing and heating a mixture of particles of an inorganic substance and a ferromagnetic substance making up the ferromagnetic material part 20 in a state containing a solvent. By using such a pressure heating method, the inorganic substance bonds together, and thus the inorganic matrix part 10 can be formed including the ferromagnetic material part 20 dispersed therein.

Specifically, when the composite member 100 in which the ferromagnetic material part 20 is dispersed as illustrated in FIG. 2 is manufactured, a mixture is first prepared by mixing a powder of an inorganic substance with a powder of a ferromagnetic substance making up the ferromagnetic material part 20. The method for mixing the inorganic substance powder with the ferromagnetic substance powder is not particularly limited and can be performed in a dry or wet process. The inorganic substance powder and the ferromagnetic substance powder may be mixed in air or under an inert atmosphere.

Next, a solvent is added to the mixture. The solvent is not particularly limited, and a solvent capable of dissolving part of the inorganic substance when the mixture is pressurized and heated can be used, for example. Also as the solvent, a solvent that reacts with the inorganic substance to form another inorganic substance different from said inorganic substance can be used. As such a solvent, at least one selected from the group consisting of an acidic aqueous solution, an alkaline aqueous solution, water, an alcohol, a ketone, and an ester can be used. As the acidic aqueous solution, an aqueous solution having a pH of 1 to 3 can be used. As the alkaline aqueous solution, an aqueous solution having a pH of 10 to 14 can be used. As the acidic aqueous solution, an aqueous solution of an organic acid is preferably used. As the alcohol, an alcohol having 1 to 12 carbon atoms is preferably used.

Then, the mixture containing the inorganic substance, the ferromagnetic substance, and the solvent is filled inside a mold. After the mold is filled with the mixture, the mold may be heated as necessary. Then, by applying pressure to the mixture inside the mold, the inside of the mold enters a high pressure state. At this time, the inorganic substance and the ferromagnetic substance becomes denser, and at the same time, particles of the inorganic substance bond with each other.

When a solvent that dissolves part of the inorganic substance is used, an inorganic compound making up the inorganic substance is dissolved in the solvent under high pressure. The dissolved inorganic compound penetrates into gaps between the inorganic substance and the ferromagnetic substance, gaps within the inorganic substance, and gaps within the ferromagnetic substance. Then, the solvent in the mixture is removed in this state to form a connection part derived from the inorganic substance, between the inorganic substance and the ferromagnetic substance, within the inorganic substance, and within the ferromagnetic substance. When a solvent that reacts with an inorganic substance to form another inorganic substance different from said inorganic substance is used, an inorganic compound making up the inorganic substance reacts with the solvent under high pressure. Then, the other inorganic substance generated through the reaction is filled in gaps between the inorganic substance and the ferromagnetic substance, gaps within the inorganic substance, and gaps within the ferromagnetic substance to form a connection part derived from the other inorganic substance.

When a solvent that dissolves part of the inorganic substance is used, heating and pressurizing conditions of the mixture containing the inorganic substance, the ferromagnetic substance, and the solvent are not particularly limited as long as the conditions are such that the dissolution of the surface of the inorganic substance progresses. When a solvent that reacts with an inorganic substance to form another inorganic substance different from said inorganic substance is used, heating and pressurizing conditions for the mixture are not particularly limited as long as the reaction between the inorganic substance and the solvent progresses. For example, it is preferable that the mixture containing the inorganic substance, the ferromagnetic substance, and the solvent be heated to 50 to 300° C. and then be pressurized at a pressure of 10 to 600 MPa. Note that the temperature at which the mixture containing the inorganic substance, the ferromagnetic substance, and the solvent is heated is more preferably 80 to 250° C., still more preferably 100 to 200° C. The pressure at which the mixture containing the inorganic substance, the ferromagnetic substance, and the solvent is pressurized is more preferably 50 to 400 MPa, still more preferably 50 to 200 MPa.

Then, the composite member can be obtained by taking out the molded body from the inside of the mold. Note that the connection part derived from the inorganic substance and formed between the inorganic substance and the ferromagnetic material part 20, within the inorganic substance, and within the ferromagnetic material part 20 is preferably the amorphous part 30 described above.

Figure 3:
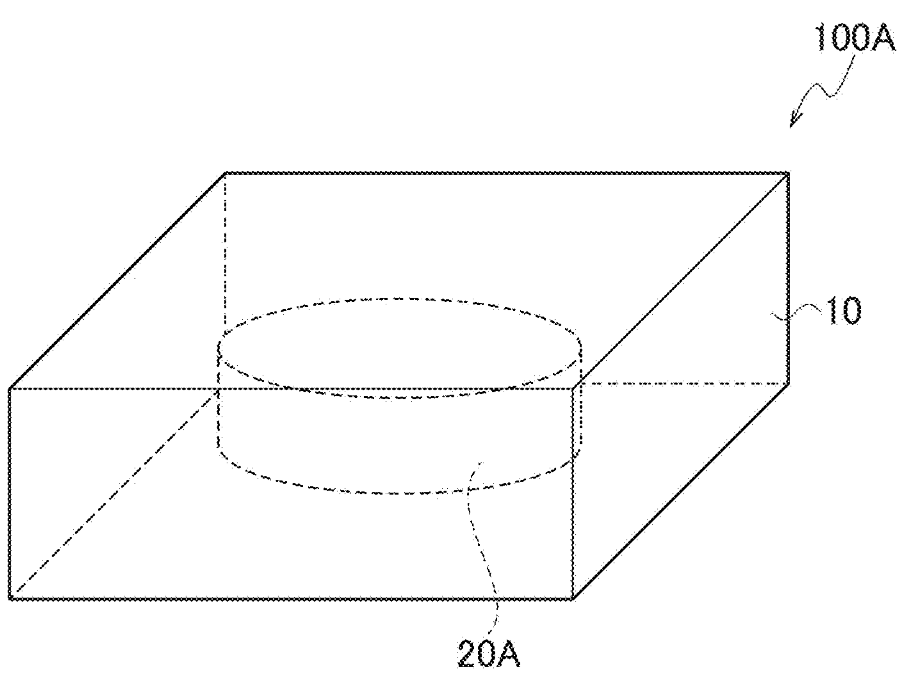
FIG. 3 is a perspective view schematically illustrating another example of the composite member according to the present embodiment.

Note that the composite member 100A illustrated in FIG. 3 in which the ferromagnetic material part 20 is in the shape of an aggregate can be manufactured also in the same manner as described above. Specifically, an inorganic substance powder and an aggregate-shaped ferromagnetic substance making up the ferromagnetic material part 20 are filled inside a mold. Then, a solvent is injected inside the mold to penetrate into the powder of the inorganic substance. Then, as described above, the composite member 100A can be obtained by heating and pressurizing the mixture containing the inorganic substance, the ferromagnetic substance, and the solvent.

Here, a sintering method has been known as a method for manufacturing an inorganic member made from ceramic. The sintering method is a method for obtaining a sintered body by heating an aggregate of a solid powder made from an inorganic substance at a temperature lower than the melting point. However, in the sintering method, the solid powder is heated to 1000° C. or higher, for example. Thus, when the sintering method is used to obtain a composite member made from an inorganic substance and a magnetized ferromagnetic substance, it is not possible to obtain a composite member having magnetism because the ferromagnetic substance is demagnetized due to heating at a high temperature. That is, when the heating temperature of the ferromagnetic substance exceeds the Curie temperature, the ferromagnetic substance undergoes a transition to a paramagnetic substance and is demagnetized or degaussed, and thus a composite member having magnetism cannot be obtained.

However, in the method for manufacturing the composite member according to the present embodiment, a mixture made by mixing an inorganic substance powder and a ferromagnetic substance making up the ferromagnetic material part 20 is heated at a low temperature of 300° C. or less. Hence, the Curie temperature of the ferromagnetic substance making up the ferromagnetic material part 20 is not exceeded, and thus a composite member having magnetism can be efficiently obtained. Furthermore, since the mixture of the inorganic substance powder and the ferromagnetic substance is heated at a low temperature, a change in the composition of the ferromagnetic substance is unlikely to occur. Hence, the composite member can obtain magnetic properties due to the ferromagnetic material part 20.

Furthermore, in the manufacturing method according to the present embodiment, since a mixture made by mixing an inorganic substance powder with a ferromagnetic substance is pressurized while being heated, the inorganic substance aggregates to form the inorganic matrix part 10, which is dense. Consequently, the number of pores inside the inorganic matrix part 10 decreases, and thus a composite member can be obtained having high strength while the oxidative deterioration of the ferromagnetic material part 20 is suppressed.

Next, a method for manufacturing a composite member is described in which the inorganic substance making up the inorganic matrix part 10 is boehmite. The composite member in which the inorganic substance is boehmite can be manufactured by mixing hydraulic alumina, a ferromagnetic substance making up the ferromagnetic material part 20, and a solvent containing water, and then pressing and heating the mixture. The hydraulic alumina is an oxide obtained by heat-treating an aluminum hydroxide and contains p alumina. Such hydraulic alumina has the property of bonding and hardening through a hydration reaction. Hence, by using the pressure heating method, the hydration reaction of the hydraulic alumina progresses to cause the hydraulic alumina to bond together and the crystal structure is changed to boehmite, and thus the inorganic matrix part 10 can be formed.

Specifically, a hydraulic alumina powder, a ferromagnetic substance making up the ferromagnetic material part 20, and a solvent containing water are first mixed to prepare a mixture. The solvent containing water is preferably pure water or ion exchange water. However, the solvent containing water may contain an acidic substance or an alkaline substances in addition to water. As long as the solvent contains water as the main component, an organic solvent (for example, an alcohol) may be contained.

The amount of a solvent added to the hydraulic alumina is preferably such an amount that would sufficiently progress the hydration reaction of the hydraulic alumina. The amount of a solvent added is preferably 20 to 200% by mass, more preferably 50 to 150% by mass, with respect to the hydraulic alumina.

Next, the mixture made by mixing the hydraulic alumina, the ferromagnetic substance, and the solvent containing water is filled inside the mold. After the mold has been filled with the mixture, the mold may be heated as necessary. Then, by applying pressure to the mixture inside the mold, the inside of the mold enters a high pressure state. At this time, the hydraulic alumina becomes highly packed, and particles of the hydraulic alumina bond with each other to have high density. Specifically, by adding water to the hydraulic alumina, the hydraulic alumina undergoes a hydration reaction to form boehmite and an aluminum hydroxide on the surface of particles of the hydraulic alumina. By pressurizing the mixture in the mold while heating, the generated boehmite and aluminum hydroxide mutually diffuse among adjacent hydraulic alumina particles, and thus the hydraulic alumina particles gradually bond with each other. Then, the dehydration reaction progresses due to heating, and the crystal structure changes from an aluminum hydroxide to boehmite. Note that it is presumed that the hydration reaction of the hydraulic alumina, the mutual diffusion among the hydraulic alumina particles, and the dehydration reaction progress almost simultaneously.

When the molded body is taken out from the inside of the mold, the composite member can be obtained with the particles 11 having bonded with each other via at least one of the oxide or the oxide hydroxide of aluminum.

Note that the heating and pressurizing conditions for a mixture made by mixing hydraulic alumina, a ferromagnetic substance, and a solvent containing water are not particularly limited as long as the reaction between hydraulic alumina and the solvent progresses. For example, a mixture made by mixing hydraulic alumina, a ferromagnetic substance, and a solvent containing water is preferably pressurized at a pressure of 10 to 600 MPa while being heated to 50 to 300° C. Note that the temperature at which a mixture made by mixing hydraulic alumina, a ferromagnetic substance, and a solvent containing water is heated is more preferably 80 to 250° C., still more preferably 100 to 200° C. The pressure at which a mixture made by mixing hydraulic alumina, a ferromagnetic substance, and a solvent containing water is pressurized is more preferably 50 to 600 MPa, still more preferably 200 to 600 MPa.

As described above, the method for manufacturing the composite member includes a step of mixing an inorganic substance powder with a ferromagnetic substance making up the ferromagnetic material part 20 to obtain a mixture, and a step of adding to the mixture a solvent that dissolves the inorganic substance or a solvent that reacts with the inorganic substance and then pressurizing and heating the mixture. Heating and pressurizing conditions for the mixture are preferably a temperature of 50 to 300° C. and a pressure of 10 to 600 MPa.

In the manufacturing method according to the present embodiment, since the composite member is formed under such low temperature conditions, even when a pre-magnetized ferromagnetic substance is used as the ferromagnetic material part 20, the demagnetization of the ferromagnetic substance is suppressed and a composite member having magnetism can be obtained. Furthermore, when a pre-magnetized ferromagnetic substance is used as the ferromagnetic material part 20, the process of magnetizing the obtained composite member becomes unnecessary. This eliminates the need for a magnetizing device, such as a coil, which is needed to magnetize the composite member, and further, it becomes possible to simplify the manufacturing process.

In addition, the method for manufacturing a composite member in which the inorganic substance is boehmite includes a step of mixing hydraulic alumina, a ferromagnetic substance making up the ferromagnetic material part 20, and a solvent containing water to obtain a mixture, and a step of pressurizing and heating the mixture. Heating and pressurizing conditions for the mixture are preferably a temperature of 50 to 300° C. and a pressure of 10 to 600 MPa. In this manufacturing method, since the composite member is formed under low temperature conditions, the resulting member is mainly a boehmite phase. Thus, a composite member that is lightweight and is excellent in chemical stability can be obtained using a simple method.

[Use of Composite Member]

Next, the use of the composite member 100, 100A according to the present embodiment will be described. The composite member 100, 100A can be used in a structure as it has magnetism and high mechanical strength, and can be formed into a plate shape having a larger thickness as described above. As a structure provided with the composite member 100, 100A, housing equipment, housing members, building materials, and buildings are preferable. Since housing equipment, housing members, building materials, and buildings are in great demand in human life, the use of the composite member 100, 100A in the structures can be expected to have the effect of creating a new and large market.

The composite member 100, 100A according to the present embodiment can be used as a building member. A building member is a member manufactured for building, and the composite member 100, 100A can be used at least partially in the present embodiment. As described above, the composite member 100, 100A can be formed in a plate shape having a large thickness, and further has high strength and high durability. Thus, the composite member 100, 100A can be suitably used as a building member. Examples of the building member include an exterior wall material (siding) and a roof material. Further examples of the building member include road materials and exterior materials.

Furthermore, the composite member 100, 100A according to the present embodiment can also be used for an interior member. Examples of the interior member include a bathtub, a kitchen counter, a washstand, and a flooring material.

The composite member 100, 100A according to the present embodiment can also be used for various structures that utilize magnetism. Examples of such structures include an electromagnetic shield and a noise filter. The composite member 100, 100A can also be used for various devices that utilize magnetism. Examples of such devices include a sensor, a communication device, and an electronic device.

EXAMPLES

The composite member according to the present embodiment will be described in more detail below with reference to examples, but the present embodiment is not limited thereto.

Preparation of Test Samples

Example

As the inorganic substance, zinc oxide particles having an average particle size $D_{50}$ of about 1 μm (manufactured by Kojundo Chemical Laboratory Co., Ltd., purity 99.99%) were prepared. As the ferromagnetic substance, an iron powder (manufactured by FUJIFILM Wako Pure Chemical Corporation) having a particle size of 90% or more passing through a 45 μm filter was prepared. After the iron powder was weighed in such a manner that it was 12.5% by volume with respect to the zinc oxide particles, the zinc oxide particles and the iron powder were mixed using an agate mortar and pestle to obtain a mixed powder.

Next, the obtained mixed powder was put into a cylindrical molding die (φ10) having an internal space. Furthermore, 1M acetic acid was added to the mixed powder filled inside the molding die in such a manner that it was 40% by mass with respect to the zinc oxide particles. The test sample of the present example was then obtained by heating and pressurizing the mixed powder containing the acetic acid under the conditions of 100 MPa, 150° C., and 30 minutes.

Comparative Example

The test sample of the present example was obtained in the same manner as the example except that no iron powder was added.

The amounts of the added iron powder in the test samples of the example and the comparison example are summarized in Table 1.

TABLE 1

| | Example | Comparative example |
|---|---|---|
| Amount of added iron powder with respect to zinc oxide powder (vol %) | 12.5 | 0 |
| Density ratio (%) | 87.2 | 91.5 |

[Evaluation of Test Samples]

(Density Ratio Measurement)

First, the relative density was determined from the volume and mass of the test sample in each example. Then, the theoretical relative density of each test sample was determined based on the relative density of zinc oxide being 5.6 and that of iron being 7.87. That is, in the case of the example test sample, the volume ratio of the zinc oxide was 87.5% and the volume ratio of the iron powder was 12.5%, and thus the theoretical relative density was $5.6\times0.875+7.87\times0.125=5.88$. Then, the actual relative density relative to the theoretical relative density ([actual relative density]/[theoretical relative density]×100) was taken as the density ratio (%). The density ratio of each test sample is shown in Table 1.

As illustrated in Table 1, it can be seen that the addition of the iron powder decreases the density ratio. That is, it can be seen that the actual relative density decreases compared to the theoretical relative density of the test sample. It is presumed that the reason for this is that the addition of the iron powder increases the number of pores. Thus, the amount of the iron powder added is preferably adjusted in such a manner that the ratio of pores is made small.

(Magnetism Evaluation)

A ferrite magnet was placed close to the test samples of the example and the comparative example to determine whether the test samples were attracted to the magnet. As a result, the test sample of the example was attracted to the magnet, while the test sample of the comparative example was neither attracted to nor repelled by the magnet when the magnet was brought closer thereto. Thus, it can be seen that the test sample of the example has magnetism due to the ferromagnetic material part.

(Porosity Measurement)

Figure 6:
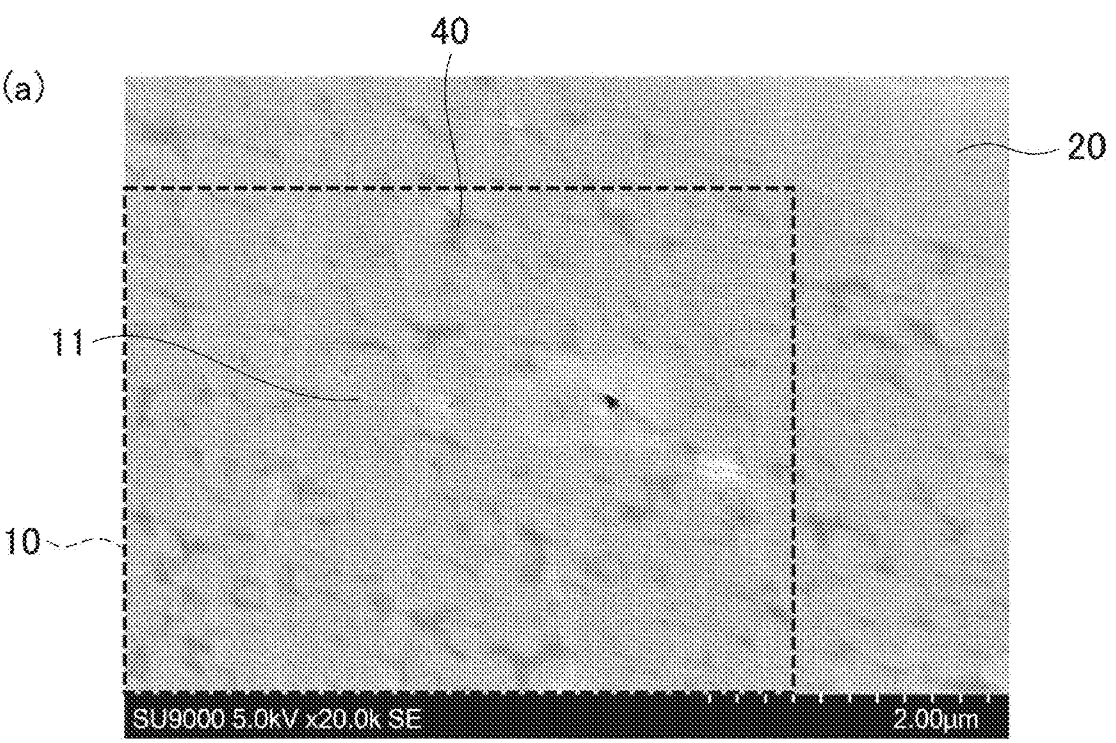
FIG. 6(*a*) is a diagram illustrating a secondary electron image at position 1 in a test sample of an example.
Figure 6:
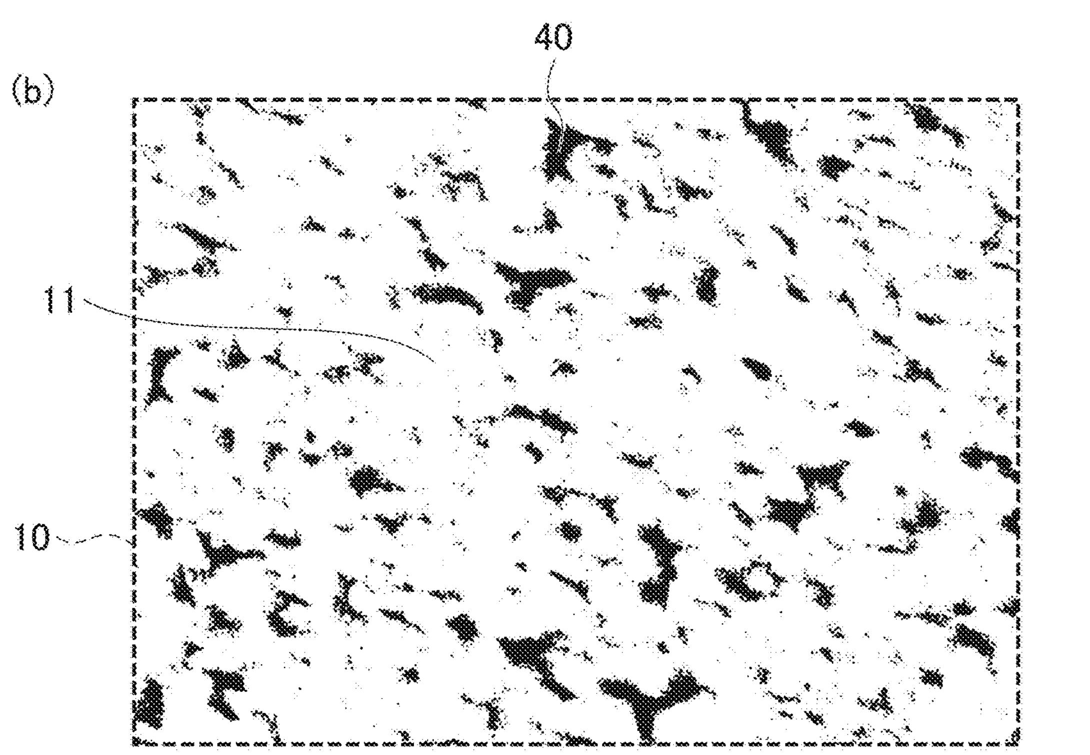

First, cross section polisher processing (CP processing) was applied to cylindrical cross sections of the test samples. Next, using a scanning electron microscope (SEM), secondary electron images were observed at a magnification of 20,000 on the cross sections of the test samples. The secondary electron images obtained by observing three points (positions 1 to 3) in the cross section of the test sample of the example are illustrated in FIG. 6(*a*), FIG. 7(*a*), and FIG. 8(*a*). In the observed secondary electron images, gray parts are constituted by zinc oxide (particles 11 of the inorganic substance) or an iron powder (ferromagnetic material part 20), and black parts are constituted by pores 40.

Next, the pore parts were clarified by binarizing the inorganic matrix part 10 in the SEM image of the three fields. The binarized images of the inorganic matrix part 10 in the secondary electron images of FIG. 6(*a*), FIG. 7(*a*), and FIG. 8(*a*) are illustrated in FIG. 6(*b*), FIG. 7(*b*), and FIG. 8(*b*), respectively. The area ratio of the pore parts was calculated from the binarized images, and the average value was taken as the porosity. Specifically, from FIG. 6(*b*), the area ratio of the pore parts at position 1 was 10.0%. From FIG. 7(*b*), the area ratio of the pore parts at position 2 was 10.2%. From FIG. 8(*b*), the area ratio of the pore parts at position 3 was 11.0%. Thus, the porosity of the test sample of the example was 10.4%, which is the average of the area ratios of the pore parts at positions 1 to 3.

Figure 7:
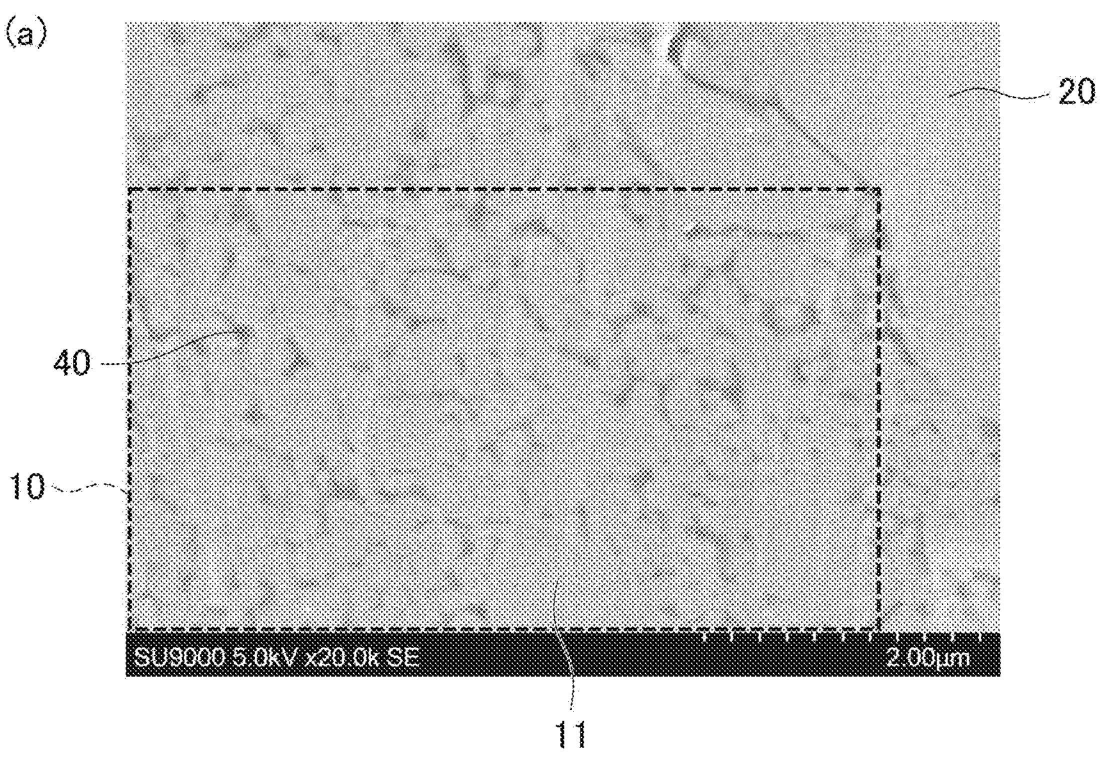
FIG. 7(*a*) is a diagram illustrating a secondary electron image at position 2 in the test sample of the example.
Figure 7:
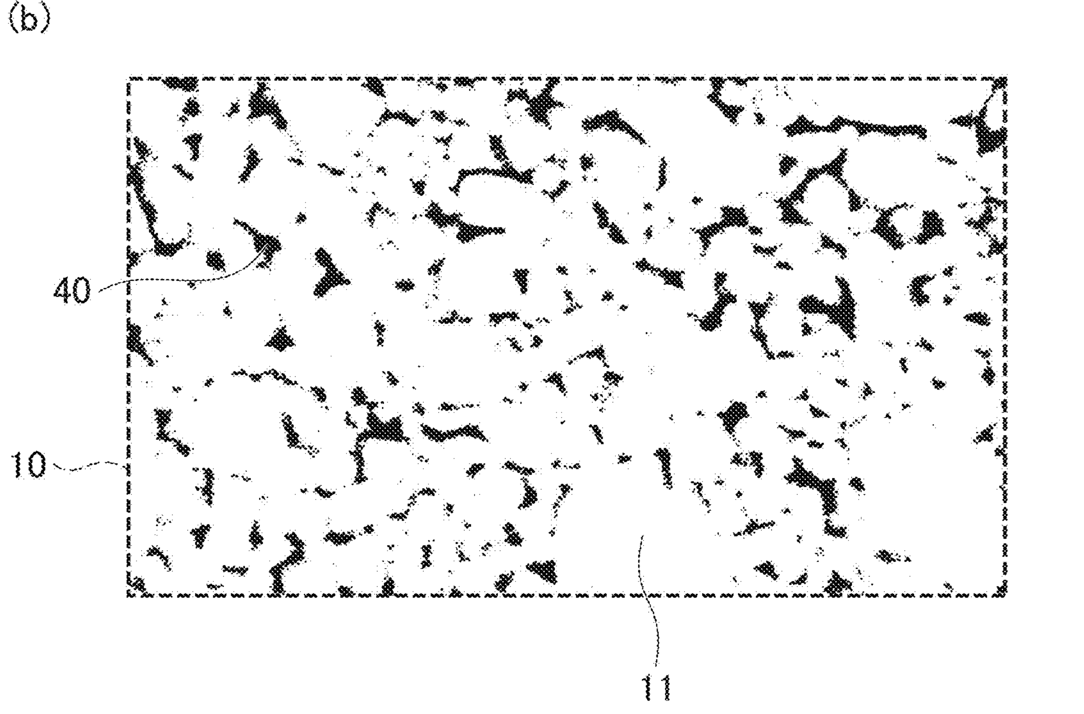
Figure 8:
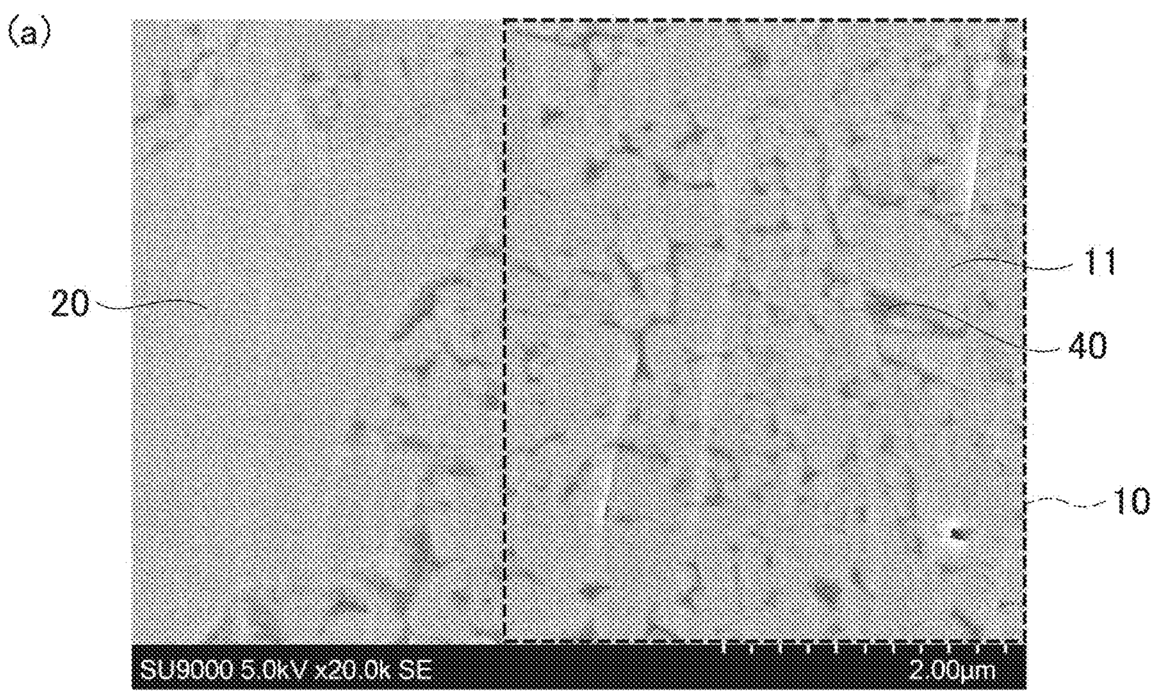
FIG. 8(*a*) is a diagram illustrating a secondary electron image at position 3 in the test sample of the example.
Figure 8:
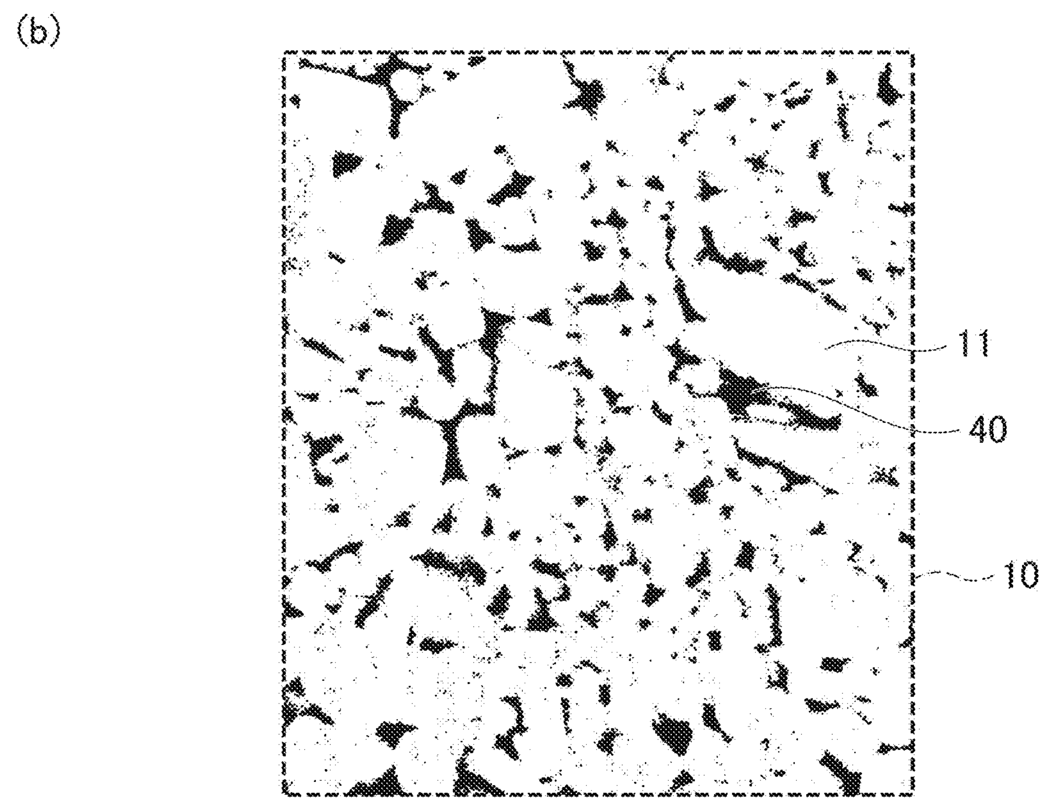

From FIGS. 6, 7, and 8, it can be seen that the porosity of the example test sample was 20% or less and this reduces the contact of the iron powder, which is a ferromagnetic material part, with air and water vapor and suppresses the oxidative deterioration.

Although the contents of the present embodiment have been described above with reference to the examples, it is obvious to those skilled in the art that the present embodiment is not limited to these descriptions and that various modifications and improvements are possible.

The entire contents of Japanese Patent Application No. 2019-202263 (filed on: Nov. 7, 2019) are incorporated herein by reference.

INDUSTRIAL APPLICABILITY

The present disclosure makes it possible to provide a composite member capable of suppressing the deterioration of a ferromagnetic substance and maintaining magnetic properties over a long period of time.

REFERENCE SIGNS LIST

10 Inorganic matrix part
**10*a*** Surface of an inorganic matrix part
11 Particles of an inorganic substance
20 Ferromagnetic material part
100, 100A Composite member

The invention claimed is:

1. A composite member comprising:

an inorganic matrix part including multiple particles made from an inorganic substance that includes at least one of a metal oxide or a metal oxide hydroxide as a main component, contains substantially no single metal and alloy, and is a diamagnetic substance or a paramagnetic substance, the particles made from the inorganic substance bonding with each other to form the inorganic matrix part; and a ferromagnetic material part that is present inside the inorganic matrix part, directly bonds with the inorganic substance making up the inorganic matrix part, and is made from a ferromagnetic substance, and a connection part derived from the inorganic substance and formed between the inorganic substance and the ferromagnetic material part, within the inorganic substance, and within the ferromagnetic material part, the connection part being an amorphous part, wherein in the inorganic matrix part, the particles of the inorganic substance are continuously present, and wherein the inorganic matrix part has a larger volume ratio than that of the ferromagnetic material part, and wherein the inorganic matrix part is a polycrystalline substance.

2. The composite member according to claim 1, wherein a porosity in a cross section of the inorganic matrix part is 20% or less.

3. The composite member according to claim 1, wherein an entire surface of the ferromagnetic material part is covered with the inorganic matrix part.

4. The composite member according to claim 1, wherein the ferromagnetic material part includes at least one of a hard magnetic substance or a soft magnetic substance.

5. The composite member according to claim 1, wherein the ferromagnetic material part contains a metal exhibiting ferromagnetism.

6. The composite member according to claim 1, wherein the inorganic substance making up the inorganic matrix part contains substantially no hydrate.

7. The composite member according to claim 1, wherein the inorganic substance contains at least one of zinc oxide or boehmite in an amount of 50 mol % or more.

8. The composite member according to claim 1, wherein the inorganic substance making up the inorganic matrix part does not contain a hydrate of a calcium compound, phosphate cement, zinc phosphate cement, and calcium phosphate cement.

9. The composite member according to claim 1, wherein an average particle size of the particles of the inorganic substance making up the inorganic matrix part is from 300 nm to 50 μm.

10. The composite member according to claim 1, wherein the particles of the inorganic substance and the amorphous part contain the same metallic element.

11. The composite member according to claim 1, wherein a thickness of the composite member is 50 μm or more.

* * * * *